(12) United States Patent
May

(10) Patent No.: US 7,183,484 B1
(45) Date of Patent: Feb. 27, 2007

(54) BULKHEAD ASSEMBLY WITH SEAL FOR STORAGE COMPARTMENTS

(75) Inventor: Brian A. May, Greenwood, MO (US)

(73) Assignee: Rom Acquisition Corporation, Belton, MO (US)

( * ) Notice: Subject to any disclaimer, the term of this patent is extended or adjusted under 35 U.S.C. 154(b) by 0 days.

(21) Appl. No.: 11/363,464

(22) Filed: Feb. 27, 2006

(51) Int. Cl.
*H02G 3/08* (2006.01)

(52) U.S. Cl. .................. 174/50; 174/135; 174/367; 174/371; 174/377; 174/382; 248/906

(58) Field of Classification Search .................. 174/48, 174/50, 135, 367, 371, 377, 378, 382, 480; 439/535; 248/906; 220/4.02, 3.8
See application file for complete search history.

(56) References Cited

U.S. PATENT DOCUMENTS 4,313,609 A * 2/1982 Clements .................. 277/641
7,041,896 B2 * 5/2006 Okamoto .................. 174/480
7,049,515 B1 * 5/2006 Collins et al. ............. 174/668
2003/0183635 A1 * 10/2003 Fujii et al. ................ 220/345.1

* cited by examiner

*Primary Examiner*—Dhiru R. Patel
(74) *Attorney, Agent, or Firm*—Blackwell Sanders Paper Martin LLP

(57) ABSTRACT

A bulkhead assembly is provided for dividing a storage compartment into two or more sub-compartments. The bulkhead includes a peripheral seal member mounted at an edge of the bulkhead assembly for engagement with interior surfaces defining at least a portion of the storage compartment. Seals are constructed and configured so as to be reversible to provide a second sealing surface to replace the first sealing surface when it becomes worn or ineffective. The seals may be mounted to the panel assembly via mechanical fasteners permitting easy reversal of the seal members.

12 Claims, 3 Drawing Sheets

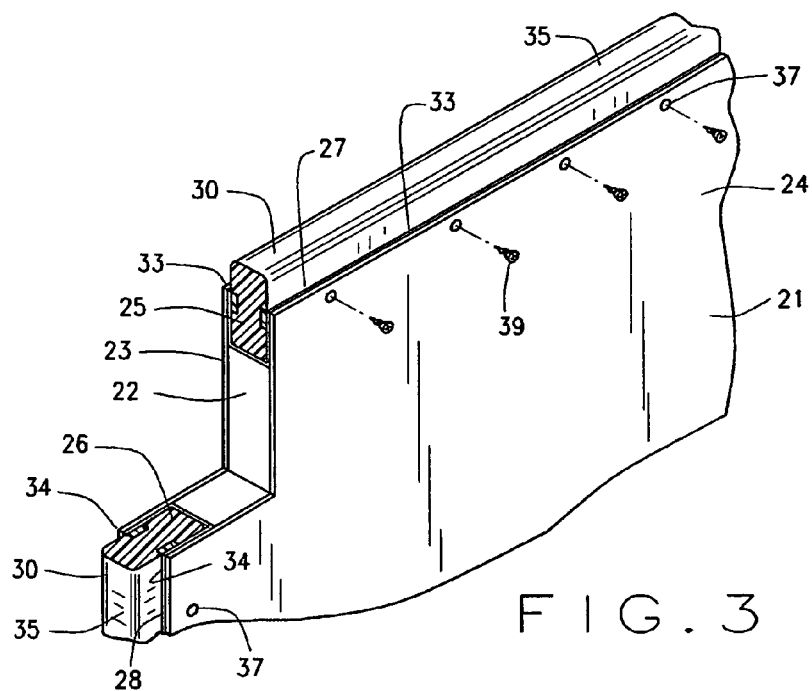
FIG. 3
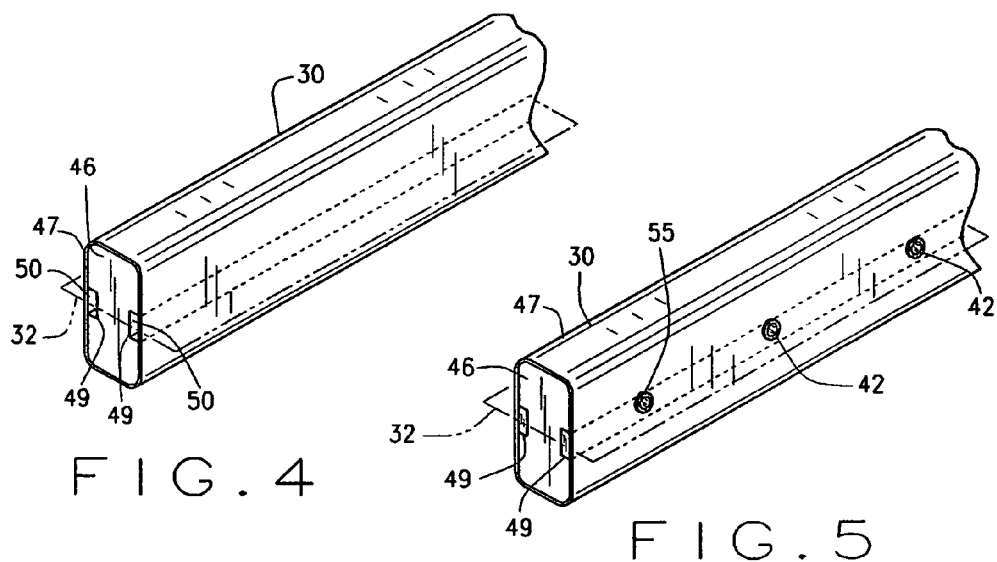
FIG. 4
FIG. 5

BULKHEAD ASSEMBLY WITH SEAL FOR STORAGE COMPARTMENTS

BACKGROUND OF THE INVENTION

In the shipping and storing of products particularly those for cold storage, like foods, a storage compartment may be separated into sub-compartments to segregate products. This can be because of the need to segregate an order for one customer from another customer or to segregate products by type or storage conditions, e.g., frozen from refrigerated from ambient. Such storage can be on a trailer for use with a truck tractor (a semi-truck), a straight truck or van body, or the like. When a mobile storage compartment is involved, the bulkheads are movable relative to the interior walls of the storage compartment to accommodate various types and sizes of loads at various times within the storage compartment. The bulkheads are movable and can be secured in a desired location for example with straps attached to securement devices within the storage compartment. The bulkheads will typically include a main panel, having outer peripheral edges providing a bulkhead sized and shaped to fit within the compartment and engage surfaces defining the perimeter of the storage compartment. The main panel may be either of a single panel portion or a multiple panel portion bulkhead joined at a seam as for example with one or more hinge assemblies. A panel may comprise an insulating member, a bottom skirt or kick plate for engagement with the storage compartment floor, and outer peripheral edges along the sides and top of the panel. Seals may be provided at one or more of the edges typically, the top and side edges to help effect a seal between sidewalls and a ceiling and perhaps even the floor, to environmentally seal one sub-compartment from another sub-compartment. While prior art bulkheads have been used effectively, they do present certain problems. A principal problem with these bulkheads is that the seals wear requiring either very expensive repair or replacement of the bulkhead panels or at least a new seal. Panels have been provided with replaceable seals, but replacement requires proximity to a source of replacement seals and tools to effect the replacement. Neither of these options can be conveniently done without return to a repair center.

There is thus a need for an improved bulkhead with an improved seal.

SUMMARY OF THE INVENTION

The present invention involves the provision of a bulkhead having a replaceable edge seal member. At least one side edge of a bulkhead panel has a seal member extending therefrom. The seal member is mounted in a respective groove with fasteners that permit the removal, reorienting, reinsertion and resecurement of a seal member. The seal is reversible about at least one longitudinal central plane and may be repositioned to expose a new seal surface and then resecured to the panel for sealing engagement with surfaces partially defining a storage compartment. The compartment surfaces may include faces of sidewalls, the floor and the ceiling. Securement devices may be provided to secure the bulkhead in a predetermined position within the storage compartment.

BRIEF DESCRIPTION OF THE DRAWINGS

FIG. 3 is an enlarged fragmentary perspective view of a portion of the bulkhead assembly seen in FIG. 2 encompassed by the circle designated 3.

FIG. 4 is an enlarged fragmentary perspective view of a portion of a seal member usable with a panel of with the bulkhead.

FIG. 5 is an enlarged fragmentary perspective view of an alternative embodiment of the seal member seen in FIG. 4.

Like numbers throughout the various Figures designate like or similar parts or structure.

DETAILED DESCRIPTION

Figure 1:
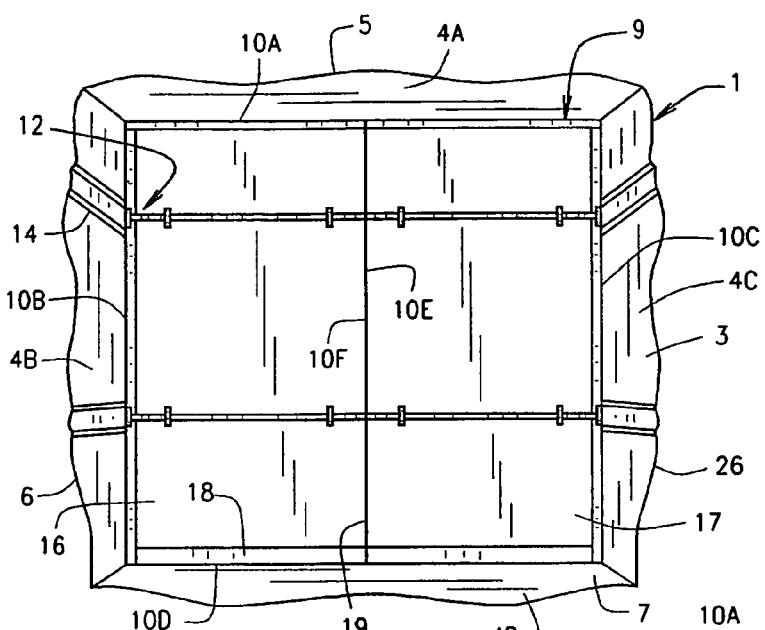
FIG. 1 is a fragmentary perspective view of a portion of a storage compartment having a bulkhead positioned therein to separate the storage compartment into a plurality of sub-compartments.

In the referenced numeral 1 designates generally a storage device such as a trailer for a tractor trailer, a truck, or van bed, forming an enclosure or a stationary storage device for example a storage room. The present invention is particularly useful with mobile storage devices for example refrigerated (including freezer) trailers and other truck or van bodies. The storage device 1 has an interior compartment 3 at least partially defined by a series of surfaces 4A–D which may be surfaces of a ceiling 5, sidewalls 6 and floor 7. End walls, not shown, are also preferably provided to provide a closed compartment 3. The interior transverse shape of the compartment 3 is preferably generally rectangular. A bulkhead assembly 9 is positioned in the compartment 3 and has edge portions 10A–D that engage various of the surfaces 4A–D respectively providing a wall located between the end walls. In the event the storage compartment is a portion of a truck, securement devices 12 such as straps and retainers are secured within tracks 14 used to secure a bulkhead assembly 9 at a desired location within the compartment 3 in an upstanding orientation. Such assemblies are well known in the art and are exemplified by products supplied by ROM Acquisition Corp. such as the Generation II Insulated Bulkhead System. The edges 10A–D define a perimeter for the bulkhead assembly 9 that corresponds generally to the interior perimeter defined by the surfaces 4A–D whereby the bulkhead assembly 9 forms a partition across the compartment 3 dividing the compartment 3 into sub-compartments providing a sealed barrier or wall between sub-compartments.

Figure 2:
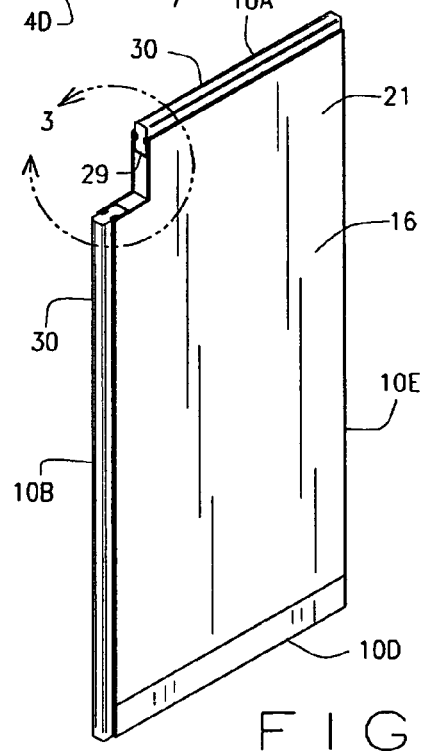
FIG. 2 is an enlarged perspective view of one panel portion of a multi-panel portion bulkhead assembly with portions broken away to show detail thereof.
Figure 7:
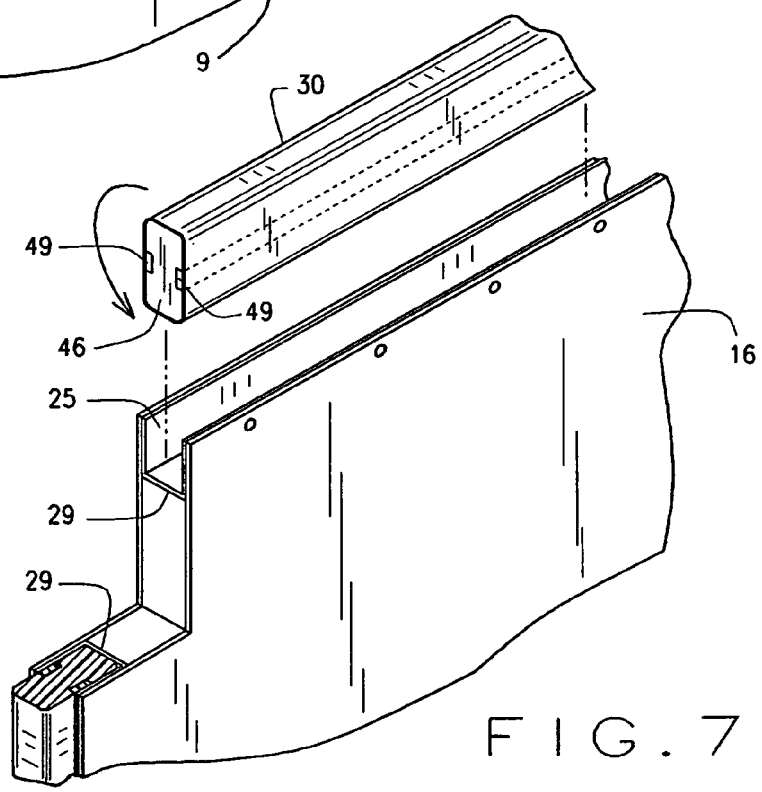
FIG. 7 is an enlarged exploded fragmentary perspective view of a bulkhead panel and seal member with the seal being shown out of a receiving groove.

As seen in the various Figures, the bulkhead assembly 9 can be comprised of one or a plurality of panels forming a wall. In the form of bulkhead assembly 9 shown in FIG. 1, the bulkhead assembly is a bi-fold arrangement having two panels 16, 17 hingedly joined as at 19 which is shown as a generally central hinge joint. An enlarged view of one of the panels, panel 16, is seen in FIG. 2. A further enlarged view of a portion of the panel 16 is seen in FIG. 3. The panels 16 and 17 are similar in construction with one being a left hand panel and one being a right hand panel and thus being mirror images of one another about the joint 19. A description of one of the panels suffices for a description of the other panel. The panel 16 as seen in FIGS. 2 and 3 is generally rectangular in shape at the outer perimeter and has a plurality of edge portions 10A, 10B, 10D in addition to the center edge portion 10E. The edge 10E abuts an edge 10F of the adjacent panel 17 as seen in FIG. 1. The edges 10A, 10B, 10D, and 10E define the outer perimeter of the panel 16. A kickplate 18, which can be in the form of an extruded plastic, e.g., polyethylene, generally U-shaped channel can be provided at the edge 10D. The panel 16 includes a center panel portion 21 that includes an inner core portion 22 which may be made of a closed or open cell foam of the desired density, rigidity and resilient flexibility. A suitable material is a closed cell expanded polystyrene. The core 22 is covered on the opposite main surfaces with the covers 23, 24 forming a sandwich assembly. Portions of the covers 23, 24 extend laterally outwardly of the core 22 forming grooves 25, 26 each having a respective open side 27, 28. The covers 23, 24 can include an inside layer of closed cell foam and an exterior layer of relatively rigid fiberglass reinforced plastic (FRP) bonded to the core 22. The grooves 25, 26 are shown as being positioned on two adjacent side edges, 10A, 10B for the illustrated embodiment seen in FIGS. 1–3. The grooves 25, 26 may have any suitable transverse cross-sectional shape but preferably, the grooves 25, 26 are generally rectangular having three closed sides and the respective open side 27 or 28. The grooves 25, 26 may be lined with a relatively rigid U channel 29 (FIG. 7) and may be retained in a groove as by adhesive bonding or friction. The channel 29 may be an extruded plastic like high density polyethylene. A seal member 30, described below, is received in each groove 25, 26 and is removably secured in place therein. An outer surface 35 of a respective seal 30 forms the edges 10A and 10B. In the illustrated structure. No seal 30 is provided at the edge 10D or 10E in a preferred embodiment.

As seen, the seals 30 are elongate having a generally central longitudinally extending plane 32 with the seal 30 being reversible and preferably generally symmetrical about the plane 32, i.e., portions of the seal 30 on opposite sides of the plane 32 are generally the same in size, shape and construction with the opposite sides preferably being mirror images of one another. The plane 32 is preferably positioned within a groove 25, 26. It is to be noted, that the seal 30 may be reversible and also preferably symmetrical about two orthogonal central longitudinally extending planes to provide four seal surfaces 35 instead of the two illustrated in FIGS. 3 and 4. The seal 30 is sized and shaped to be received within a respective groove 25, 26 having a portion thereof projecting outwardly from a respective edge 33, 34 of the central portion 21 of the panel 16 to thereby present the outer positioned surface 35 of the seal 30 for engagement with one of the surfaces 4A–D as desired. In the illustrated structure, the seal surfaces 35 of the two seals 30 mounted to the panel 10 engage a respective one of the surfaces 4A and 4B. The seals 30 for the panel 17 would engage a respective one of the surfaces 4A and 4C. For a non-bifold bulkhead assembly, the surfaces 35 would preferably engage the surfaces 4A, B and C.

Figure 6:
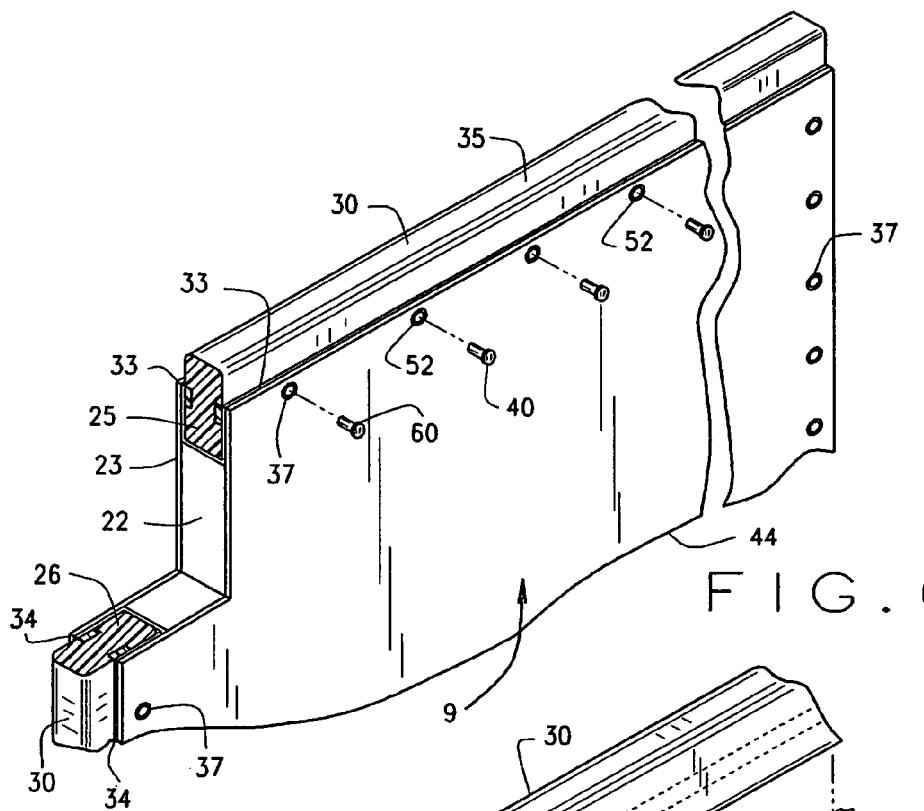
FIG. 6 is an enlarged fragmentary perspective view of another modified form of the present invention and illustrates a single panel portion bulkhead system.

The seals 30 may be removably secured within the grooves 25, 26 in any suitable manner and preferably with some form of mechanical fastener. This may be by rib and groove arrangements, snap lock components, mechanical fasteners such as screws 39 or push pins 40. As seen in FIG. 3 and in FIG. 6, apertures 37 are provided through the covers 23 and/or 24 and sidewalls of channel 29 to allow the fasteners such as screws 39 or push pins 40 to pass therethrough and be cooperatively interengaged with a seal 30 to releasably retain a seal 30 within its respective groove 25, 26. As seen in FIG. 5, the seal 30 may have recesses 42 therein for receipt of a push pin 40 to releasably mount a seal 30 to the panel 16, 17 or to the panel 44 which is used in a non-bifold or single panel bulkhead assembly (FIG. 6). When a seal 30 becomes worn or non functional on one exposed surface 35, it may be simply reversed, for example, by 180° rotation about its longitudinal axis, reinserted into the respective groove 25, 26 and resecured in place with the appropriate fastener 39, 40. As seen in FIG. 4, the seal 30 is provided with a core 46 and an outer skin 47. This may be formed by co-extrusion or lamination. The core 46 is preferably an open cell foam to provide resilient compressibility and the skin is preferably a woven fabric like ballistic nylon to provide abrasion resistance. The seal 30 as seen in FIG. 4 is provided with reinforcing strips 49 positioned and secured within grooves 50 in the core 46 as by adhesion and sandwiched between the core 46 and the skin 47. The strips 49 can be used to receive screw fasteners 39 therethrough to help resist the pull out of or stripping by the screws 39 during use of the bulkhead assembly 9. The fasteners 39 may be of the self tapping type. The strips 49 may be made of a suitable polymeric material such as polyethylene. The apertures 37 for the push pins 40 may include polymeric grommets 52 suitably mounted to the panel 44. The push pins 40 may also be of a polymeric material such as nylon and can be retained in place by frictional engagement with the grommet 52 and/or hole liners 55 each with a respective recess 42 and mounted to the seal 30 as seen in FIG. 5. The pins 40 have a shank 60 sized and shaped relative to either or both of the aperture 37 or recess 42 to provide frictional engagement and retention. Preferably the axes of the shanks 60 or of the threaded shanks of the screws 39 are each adjacent to and generally parallel to the plane 32 and more preferably lie in a plane generally parallel to the plane 32. Preferably one of the apertures 37 or recesses 42 is larger than the shanks 60 to provide positional tolerance for mounting of a seal 30. Preferably, the width of the grooves 25, 26 is such as to provide some frictional engagement between the inner surfaces defining the grooves 25, 26 and the exterior surface of the seals 30 positioned therein.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings.

The invention claimed is:

1. A bulkhead assembly comprising;
  at least one panel having a plurality of edges, at least one of said edges having an outwardly opening groove along at least a substantial portion of the length of the at least one of said edges;
  an elongate seal member with a first portion with a first seal surface thereof positioned in the groove and a second portion with a second seal surface positioned exterior of the groove and having a central transverse longitudinal plane positioned between the first and second seal surface, said seal member being reversible about said plane whereby said seal member may be reversed in the groove to selectively expose the first seal surface or the second seal surface for contact with a surface partially defining an interior of a compartment; and a fastener assembly associated with the panel and the seal member to releasably secure the seal member in the at least one groove, said fastener assembly having at least one portion adjacent to and in a plane generally parallel to the central plane.

2. The bulkhead assembly as set forth in claim 1 wherein the fastener assembly includes a plurality of first apertures through at least one sidewall portion defining the groove and a plurality of fasteners each extending through one of said first apertures for retaining engagement with a portion of the seal member.

3. The bulkhead assembly as set forth in claim 2 wherein the seal member having polymeric foam portion and a reinforcing member carried by the polymeric foam for fastening engagement with the fasteners.

4. The bulkhead assembly as set forth in claim 3 wherein the seal member includes an exterior cover enclosing at least a portion of the polymeric foam and the reinforcing member.

5. The bulkhead assembly as set forth in claim 4 wherein the fasteners include screws.

6. The bulkhead assembly as set forth in claim 2, said seal being generally symmetrical about said central plane.

7. The bulkhead assembly as set forth in claim 4 wherein the fasteners include pins and the reinforcing member includes a plurality of second apertures each generally aligned with one of said first apertures, one of said pins being received through one of said first apertures and one of said second apertures and being at least partially held in place by friction.

8. The bulkhead assembly as set forth in claim 4 wherein the panel includes a groove on each of at least two adjacent of said edges and each of said grooves having a respective seal member positioned therein.

9. The bulkhead assembly as set forth in claim 8 wherein the panel includes a groove on each of at least three of said edges and each of said grooves having a respective seal member positioned therein.

10. The bulkhead assembly as set forth in claim 9 wherein said panel includes at least two portions joined by a hinge forming a foldable panel.

11. The bulkhead assembly as set forth in claim 8 wherein said central plane of each seal member being located within a respective said groove.

12. A bulkhead for dividing the inside of a storage compartment, said bulkhead including:

a generally rectangular panel having a plurality of side edge portions, at least one of said side edge portions having an outwardly opening groove;

an elongate seal member positioned in the groove and having a transverse cross sectional shape generally symmetrical about at least one longitudinal central plane and having generally opposed seal surfaces on opposite sides of the at least one plane, at least one of said seal surfaces being exposed and at least one of said seal surfaces being in said groove; and at least one fastener device cooperating with the seal and the panel removably mounting the seal to the panel and permitting reversing of the seal to expose the seal surface in the groove and have the exposed seal surface positioned within the groove.

\* \* \* \* \*